United States Patent
Wu et al.

(10) Patent No.: US 12,156,783 B2
(45) Date of Patent: Dec. 3, 2024

(54) IMPLANT PACKAGING BOTTLE

(71) Applicant: GUILIN WOODPECKER MEDICAL INSTRUMENT CO., LTD., Guangxi (CN)

(72) Inventors: Xunxian Wu, Guangxi (CN); Lei Zhou, Guangxi (CN); Lin Chang, Guangxi (CN); Jun Zhou, Guangxi (CN)

(73) Assignee: GUILIN WOODPECKER MEDICAL INSTRUMENT CO., LTD., Guangxi (CN)

( * ) Notice: Subject to any disclaimer, the term of this patent is extended or adjusted under 35 U.S.C. 154(b) by 373 days.

(21) Appl. No.: 17/739,303

(22) Filed: May 9, 2022

(65) Prior Publication Data

US 2022/0409346 A1 Dec. 29, 2022

(30) Foreign Application Priority Data

Mar. 10, 2021 (CN) .......................... 202110261233.7

(51) Int. Cl.
*A61C 8/00* (2006.01)

(52) U.S. Cl.
CPC .................. *A61C 8/0087* (2013.01)

(58) Field of Classification Search
CPC ...... A61C 8/0087; B65D 51/26; B65D 23/00; B65D 41/04; A61L 2/10
See application file for complete search history.

(56) References Cited

U.S. PATENT DOCUMENTS

2019/0159874 A1 * 5/2019 Jung ...................... A61C 8/005

FOREIGN PATENT DOCUMENTS

| EP | 3701905 A1 * | 9/2020 | ............. A61C 8/008 |
| ES | 2790048 A1 * | 10/2020 | ............. A61C 19/00 |
| KR | 20180079779 A * | 7/2018 | ............. A61C 19/02 |
| WO | WO-2018164497 A1 * | 9/2018 | ............. A61C 19/02 |

* cited by examiner

*Primary Examiner* — David E Smith
*Assistant Examiner* — Christopher J Gassen
(74) *Attorney, Agent, or Firm* — BCF LLP

(57) ABSTRACT

The present disclosure discloses an implant packaging bottle, which includes a bottle body; a bottle cap, wherein the bottle cap has a bottle cap body detachably connected with one end of the bottle body and an implant support frame configured to extend into the bottle body; an electrified base, which is provided at the other end of the bottle body; an implant bracket detachably connected to the implant support frame, wherein the implant can be installed on the implant bracket; and an ultraviolet light source configured to be provided in the bottle body, wherein the ultraviolet light source is electrically connected to the electrified base, and a plurality of ultraviolet light sources are provided; and when the implant support frame is extended into the bottle body, a plurality of ultraviolet light sources are provided around the implant on the implant bracket.

12 Claims, 16 Drawing Sheets

IMPLANT PACKAGING BOTTLE

CROSS-REFERENCE TO RELATED APPLICATION

The present disclosure claims the priority to the Chinese patent application filed with the Chinese Patent Office on Mar. 10, 2021 with the filing No. 202110261233.7, and entitled "Implant Packaging Bottle", all the contents of which are incorporated herein by reference in entirety.

TECHNICAL FIELD

The present disclosure relates to the technical field of an implant packaging container equipment, in particular to an implant packaging bottle.

BACKGROUND ART

A dental implant is a device that is implanted into the upper and lower jaws of the missing teeth position of the human body in a manner of surgery, after the surgical wound is healed, a restoration abutment and a dental crown are installed on upper part thereof. For the modern oral-cavity field, dental implants are widely used in tooth loss and restoration due to characteristic of beauty, comfort and long life thereof, which are called the third set of human teeth.

Hydrophilic dental implants generally have better biological activity, a series of studies have shown that hydrophilic implants have a promoting effect on the differentiation of osteocytes, especially for early osseointegration. However, the contact angle of the existing implants is generally higher (about 90°), and some hydrophilic implants have a significantly decreased hydrophilicity after being placed for a period of time; the main reason of the non-hydrophilic implants is the pollution of surface carbides, during production and processing, due to the presence of carbon dioxide in the environment, the hydrophilic surface of the implant is easy to form molecular bonds with carbon molecules, which adheres to the surface of the implant so that it cannot combine with water molecules and becomes hydrophobic, this process makes the preservation of hydrophilic implants quite difficult. Some manufacturers try to preserve the implants in an activated state by using technologies such as isolating the air, but due to high cost and poor effect thereof, it is difficult to maintain the hydrophilicity for a long time.

Ultraviolet light irradiation is a process that can perform activating treatment on the surface of the implant before dental implanting surgery, so that the implant can regain a hydrophilic surface, but as for the existing ultraviolet activation irradiation device, the implant needs to be taken out from the packaging bottle in advance, so that it is exposed to the air, which is extremely susceptible to pollution. In addition, the implant cannot be sterilized for a second time after being taken out, once the operation time needs to be changed due to the patient or doctor's reasons, the implant cannot be used continuously, thereby resulting in waste.

Therefore, how to reduce the risk of infection and avoid waste is an urgent problem to be solved by those skilled in the art.

SUMMARY

In view of this, the present disclosure provides an implant packaging bottle to reduce the risk of infection and avoid waste.

To achieve the above-mentioned purpose, the present disclosure provides the following technical solutions.

An implant packaging bottle, comprising:
a bottle body;
a bottle cap, wherein the bottle cap has a bottle cap body detachably connected with one end of the bottle body and an implant support frame configured to extend into the bottle body;
an electrified base, which is provided at the other end of the bottle body;
an implant bracket detachably connected to the implant support frame, wherein the implant may be installed on the implant bracket; and
an ultraviolet light source configured to be provided in the bottle body, wherein the ultraviolet light source is electrically connected to the electrified base, and a plurality of ultraviolet light sources are provided; when the implant support frame is extended into the bottle body, a plurality of the ultraviolet light sources are provided around the implant on the implant bracket.

Optionally, in the above-mentioned implant packaging bottle, the ultraviolet light emitted by the ultraviolet light source is UV-A, UV-B or UV-C; and
the ultraviolet light source is an excimer lamp.

Optionally, in the above-mentioned implant packaging bottle, when the implant support frame is extended into the bottle body, the distance from the ultraviolet light source to the implant is 1 mm-10 mm.

Optionally, in the above-mentioned implant packaging bottle, one end of the implant support frame away from the bottle cap body has a connecting part detachably connected to the implant bracket;
an avoidance hole and a concave arc surface is further provided on the implant support frame; and
the concave arc surface is provided on the implant support frame to form an avoidance space sunken to the inside of the implant support frame, and the implant on the implant bracket is configured to be provided in the avoidance space, and the avoidance hole penetrates the concave arc surface and the outer surface of the implant support frame facing away from the concave arc surface.

Optionally, in the above-mentioned implant packaging bottle, the number of the ultraviolet light source is four, which are respectively the first ultraviolet light source, the second ultraviolet light source, the third ultraviolet light source and the fourth ultraviolet light source that are configured to be provided sequentially in the circumferential direction of the implant;
the second ultraviolet light source and the concave arc orientation of the concave arc surface are provided correspondingly, and the first ultraviolet light source and the third ultraviolet light source are symmetrically provided on two sides of the concave arc surface, and the fourth ultraviolet light source is provided corresponding to the avoidance hole.

Optionally, in the above-mentioned implant packaging bottle, one end of the implant support frame away from the bottle cap body is provided with a snapping plate, and a snapping groove is provided on the snapping plate, and the implant bracket may be snapped in the snapping groove.

Optionally, in the above-mentioned implant packaging bottle, the implant bracket comprises:
a first positioning component configured to be contacted in positioning manner to one side surface of the snapping plate;

a second positioning component configured to be contacted in positioning manner to the other side surface of the snapping plate;

a snapping part connected between the first positioning component and the second positioning component;

a fastener configured to be detachably connected with the implant, wherein the fastener is provided at the end of the first positioning component away from the second positioning component;

a circumferential positioning section configured to be matched in positioning manner with an inner wall of the implant;

an axial positioning section configured to be matched in positioning manner with an end surface of the implant, wherein one end of the axial positioning section is connected to the end of the first positioning component away from the second positioning component, and the other end of the axial positioning section is connected to the one end of the circumferential positioning section, and the other end of the circumferential positioning section is connected to the fastener; and a positioning snap ring, wherein the positioning snap ring is provided on the snapping part; the groove bottom of the snapping groove is provided with a positioning snapping groove matched with the positioning snap ring.

Optionally, in the above-mentioned implant packaging bottle, the electrified base comprises a plurality of connecting parts;

a plurality of the ultraviolet light sources are connected to the plurality of the connecting parts in one-to-one correspondence;

the ultraviolet light source comprises a lamp tube body and a conductive connecting part;

the connecting part is a connecting cylinder arranged coaxially with the lamp tube body, and a conductive connecting piece conductively connected with the conductive connecting part is provided inside the connecting part.

Optionally, in the above-mentioned implant packaging bottle, the connection opening of the connecting part is a snapping port;

the outer periphery of the conductive connecting part is provided with a limit matching piece that may pass through the snapping port and be positioned axially relatively to the snapping port.

Optionally, in the above-mentioned implant packaging bottle, the electrified base has a power acquisition component, wherein the power acquisition component is a power circuit system and a battery detachably connected to the power circuit system; or, the power acquisition component is a plug-in interface.

Optionally, in the above-mentioned implant packaging bottle, the bottle cap body comprises a top square structure and a bottle cap body; and the bottle cap body is detachably connected to one end of the bottle body.

Optionally, in the above-mentioned implant packaging bottle, an accommodating cavity is provided inside the top square structure, and the top surface or the side surface of the top square structure has a switch door for opening and closing the accommodating cavity.

Optionally, in the above-mentioned implant packaging bottle, one end of the bottle body has an external thread section, and the inside of the bottle cap has an internal thread structure matched with the external thread section; and/or the inside of the other end of the bottle body has an internal thread section, and the outside of the electrified base has an external thread structure matched with the internal thread section.

It can be seen from the above technical solutions that, in the implant packaging bottle provided by the present disclosure, the implant is installed on the implant bracket, and the implant bracket is detachably connected to the implant support frame. When the bottle cap body of the bottle cap is connected to the bottle body, the implant support frame is extended into the bottle body together with the implant bracket and the implant; and the ultraviolet light source is electrically connected to the electrified base, when the implant support frame is extended into the bottle body, a plurality of the ultraviolet light sources are provided around the implant on the implant bracket. Therefore, during clinical use, when the surface of the implant needs to be activated, power is supplied to the ultraviolet light source through the electrified base, so that the ultraviolet light emitted by the ultraviolet light source is directly irradiated on the implant, then photocatalysis is performed on the surface of the implant, so that the C and H chemical bonds on the surface of the implant are broken, and the surface cleanliness of the implant is improved. After a period of time, the bottle cap is opened, the implant is taken out from the inner bottle by using a tool (such as a special matcher), and quickly implanted into the patient's alveolar bone, which can ensure the highest activity of the surface of implant. The implant packaging bottle provided by the present disclosure realizes the built-in ultraviolet activation technology by directly providing the ultraviolet light source in the bottle body, so that the ultraviolet light emitted by the ultraviolet light source is directly irradiated on the implant to obtain the best activation effect. The surface of the implant can be activated and cleaned without taking out the implant, thereby effectively reducing the risk of infection; the secondary sterilization operation is not affected, and waste is avoided.

BRIEF DESCRIPTION OF DRAWINGS

In order to more clearly illustrate technical solutions in the embodiments of the present disclosure or in the prior art, accompanying drawings which need to be used for description of the embodiments or the prior art will be introduced briefly below, and apparently, the accompanying drawings in the following description merely show some embodiments of the present disclosure, and those ordinarily skilled in the art still could obtain other drawings in light of these accompanying drawings, without using any inventive efforts.

DETAILED DESCRIPTION OF EMBODIMENTS

Figure 1:
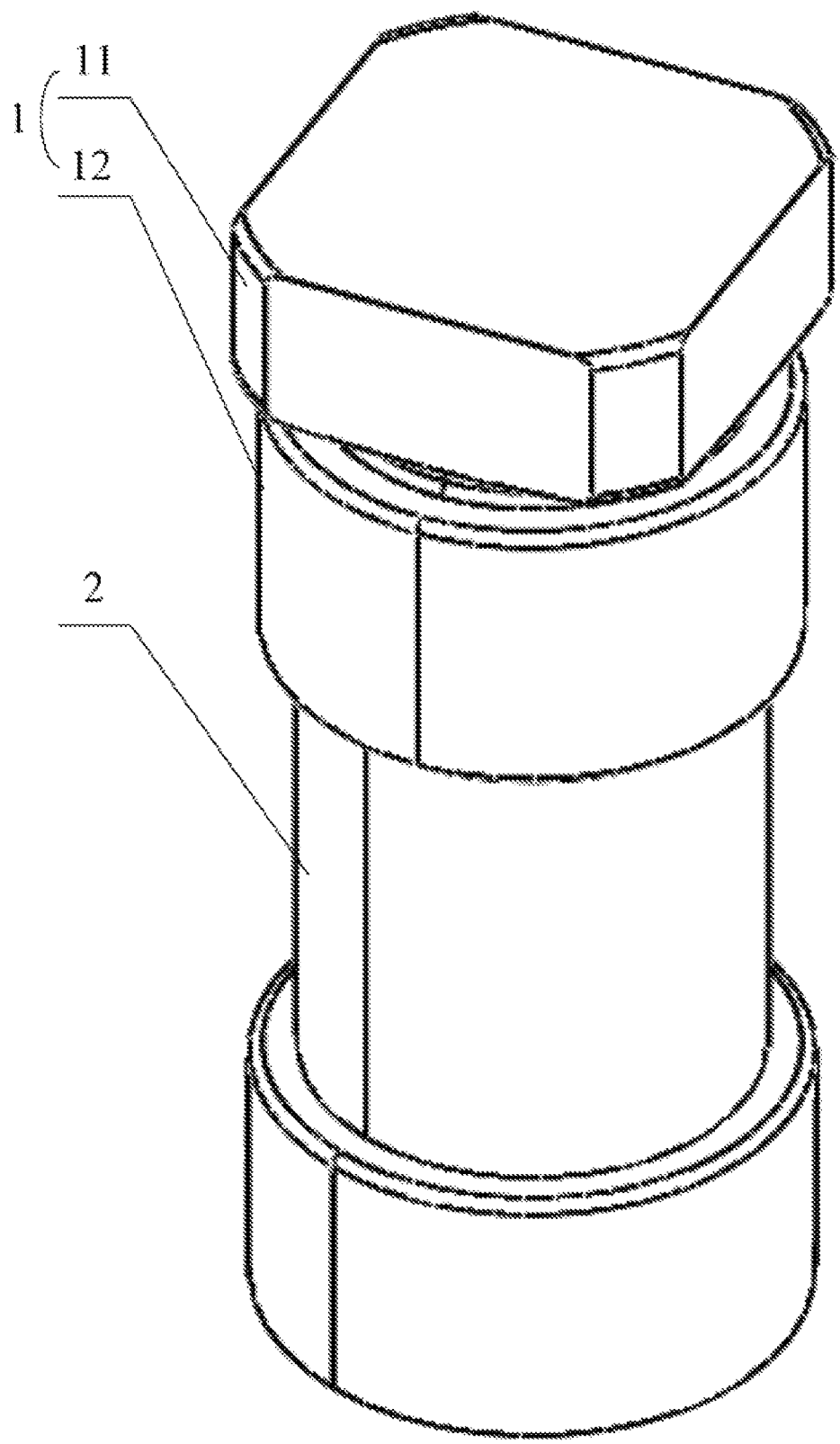
FIG. 1 is a schematic view of a three-dimensional structure of an implant packaging bottle provided by an embodiment of the present disclosure.
Figure 2:
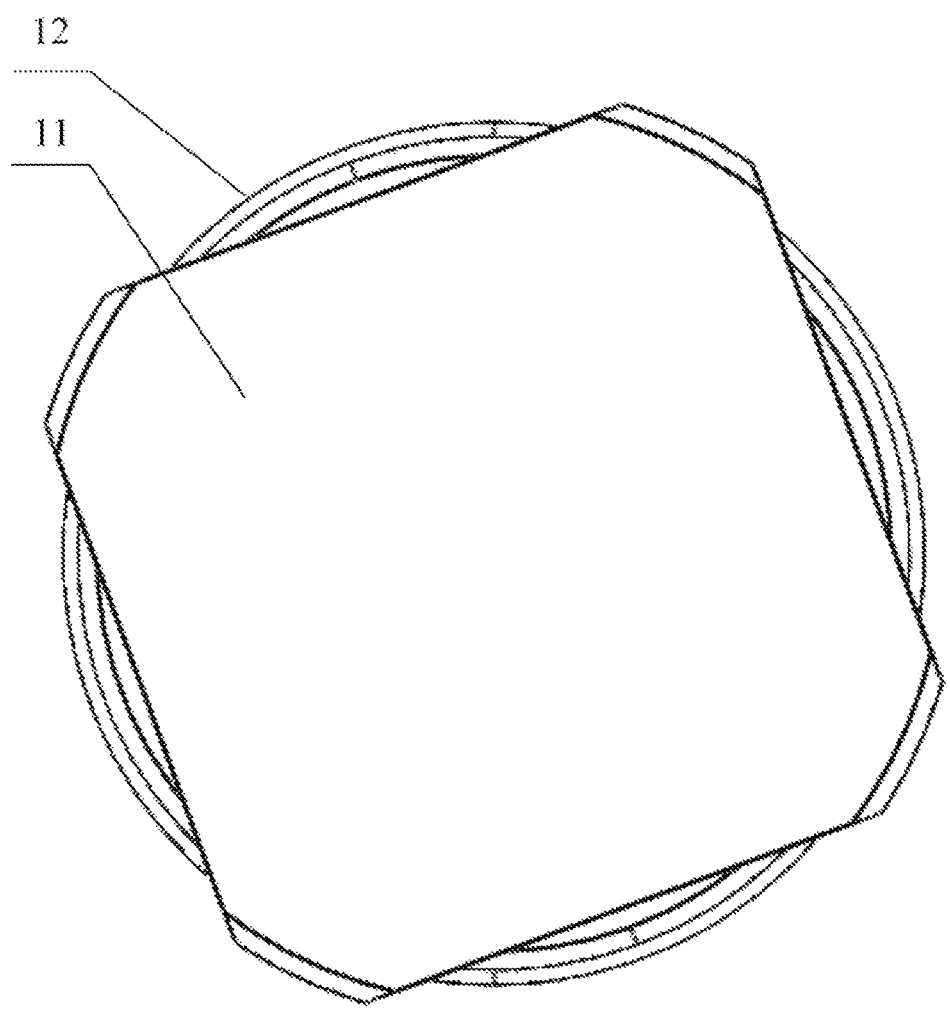
FIG. 2 is a top-view schematic view of a structure of the implant packaging bottle provided by an embodiment of the present disclosure.
Figure 3:
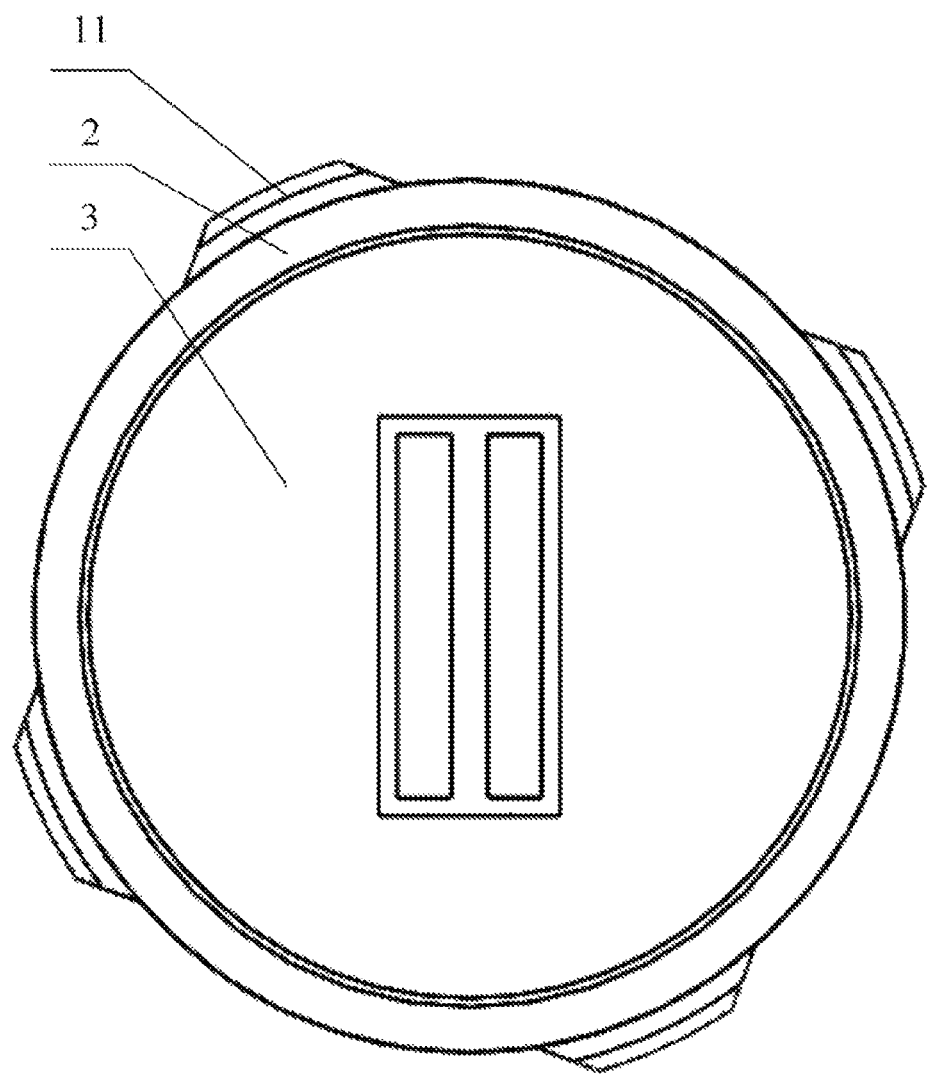
FIG. 3 is a bottom-view schematic view of a structure of the implant packaging bottle provided by an embodiment of the present disclosure.
Figure 4:
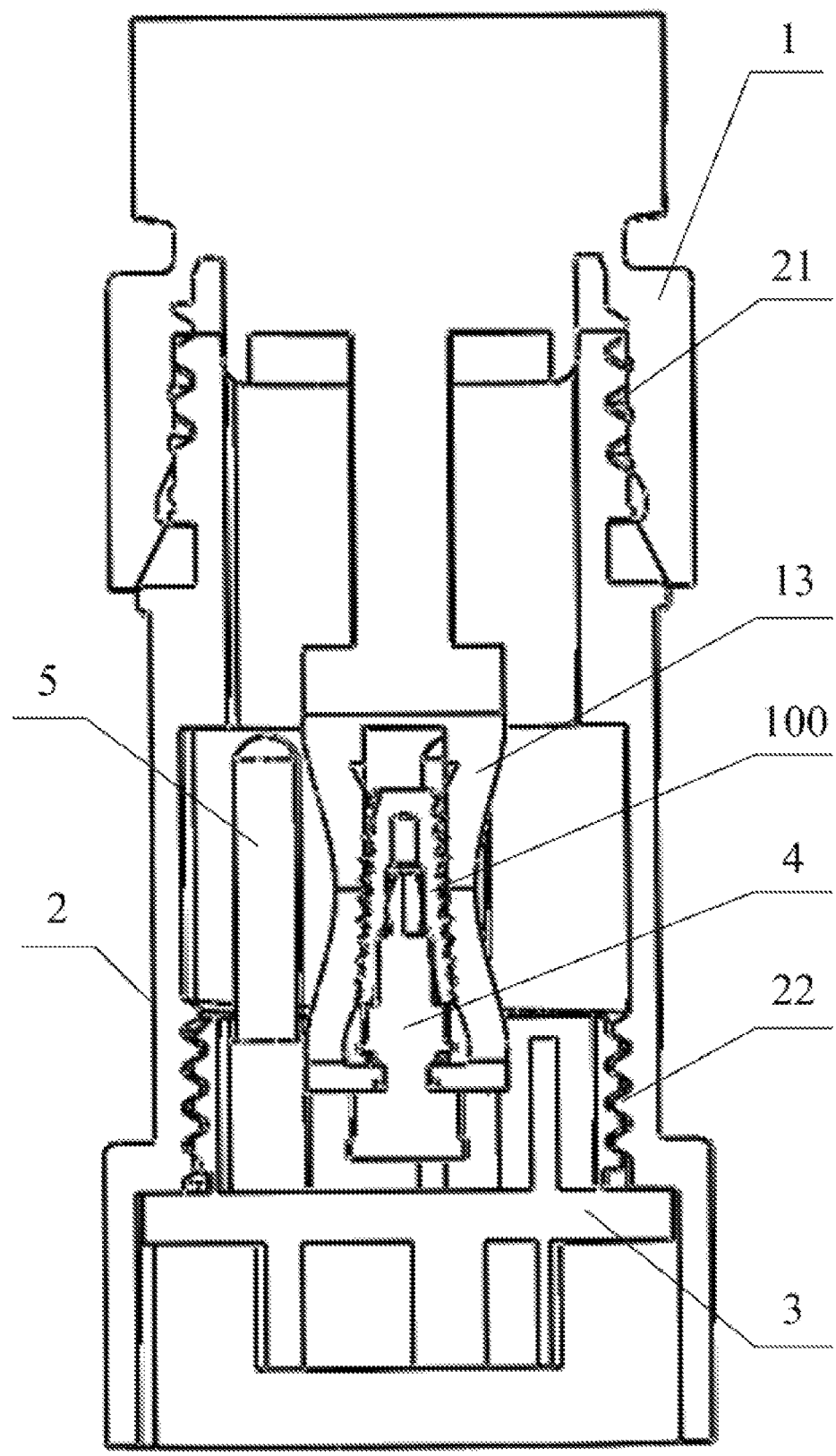
FIG. 4 is a sectional schematic view of a structure of the implant packaging bottle provided by an embodiment of the present disclosure.
Figure 5:
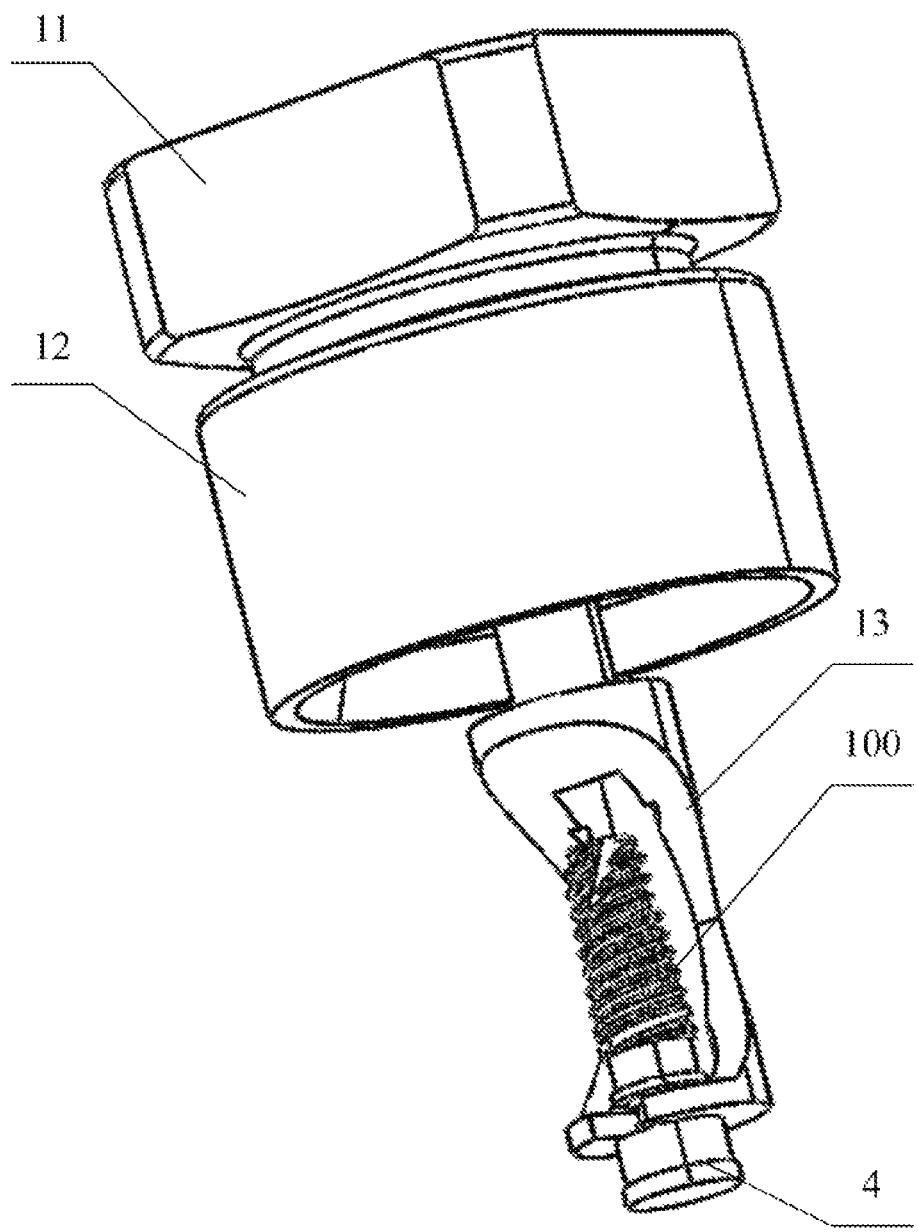
FIG. 5 is a schematic view of an installation structure of an implant bracket and an implant support frame provided by an embodiment of the present disclosure.

The present disclosure discloses an implant packaging bottle to reduce infection risk and avoid waste.

The technical solutions in the embodiments of the present disclosure will be clearly and completely described below in combination with the accompanying drawings in the embodiments of the present disclosure, and obviously, the embodiments described are merely part of the embodiments of the present disclosure, rather than all embodiments. Based on the embodiments of the present disclosure, all other embodiments obtained by those ordinarily skilled in the art, without making inventive effort, fall within the protection scope of the present disclosure.

As shown in FIG. 1-FIG. 19, an embodiment of the present disclosure provides an implant packaging bottle, which includes a bottle body 2, a bottle cap 1, an electrified base 3, an implant bracket 4 and an ultraviolet light source 5, wherein the bottle cap 1 has a bottle cap body detachably connected with one end of the bottle body 2 and an implant support frame 13 configured to extend into the bottle body 2; the electrified base 3 is provided at the other end of the bottle body 2; the implant bracket 4 is detachably connected to the implant support frame 13, wherein the implant 100 can be installed on the implant bracket 4; an ultraviolet light source 5 is configured to be provided in the bottle body 2, wherein the ultraviolet light source 5 is electrically connected to the electrified base 3, and there are a plurality of ultraviolet light source 5; and when the implant support frame 13 is extended into the bottle body 2, a plurality of the ultraviolet light sources 5 are provided around the implant 100 on the implant bracket 4.

In the implant packaging bottle provided by the embodiment of the present disclosure, the implant 100 is installed on the implant bracket 4, and the implant bracket 4 is detachably connected to the implant support frame 13. When the bottle cap body of the bottle cap 1 is connected to the bottle body 2, the implant support frame 13 is extended into the bottle body 2 together with the implant bracket 4 and the implant 100; and the ultraviolet light source 5 is electrically connected to the electrified base 3, when the implant support frame 13 is extended into the bottle body 2, a plurality of the ultraviolet light sources 5 are provided around the implant 100 on the implant bracket 4. Therefore, during clinical use, when the surface of the implant 100 needs to be activated, power is supplied to the ultraviolet light source 5 through the electrified base 3, so that the ultraviolet light emitted by the ultraviolet light source 5 is directly irradiated on the implant 100, then photocatalysis is performed on the surface of the implant 100, so that the C and H chemical bonds on the surface of the implant 100 are broken, and the surface cleanliness of the implant 100 is improved. After a period of time, the bottle cap 1 is opened, the implant 100 is taken out from the inner bottle by using a tool (such as a special matcher), and quickly implanted into the patient's alveolar bone, which can ensure the highest activity of the surface of implant 100. The implant packaging bottle provided by the embodiment of the present disclosure realizes the built-in ultraviolet activation technology by directly providing the ultraviolet light source 5 in the bottle body 2, so that the ultraviolet light emitted by the ultraviolet light source 5 is directly irradiated on the implant 100 to obtain the best activation effect. The surface of the implant 100 can be activated and cleaned without taking out the implant 100, thereby effectively reducing the risk of infection; and the secondary sterilization operation is not affected, and waste is avoided.

At present, the activation time of ordinary ultraviolet lamps is too long (generally more than 4 hours). In the implant packaging bottle provided by the embodiment of the present disclosure, since a plurality of ultraviolet light sources 5 are provided around the implant 100 on the implant bracket 4, the ultraviolet light emitted by the ultraviolet light source 5 is directly irradiated on the implant 100, which can reduce the ultraviolet activation time to less than 2 h, and thus effectively improve the activation efficiency. Of course, in the implant packaging bottle provided by the embodiment of the present disclosure, the ultraviolet irradiation time can be any time in 0.1 h-48 h, which is not specifically limited here. The implant 100 using the implant packaging bottle provided by the embodiment of the present disclosure can better directly interact with osteogenic proteins and osteoblasts in the body fluid, and has higher hydrophilicity and biological activity.

In this embodiment, the implant support frame 13 and the bottle cap body are preferably an integral structure.

For obtaining the best activation effect, the ultraviolet lights emitted by ultraviolet light source 5 are UV-A, UV-B, UV-C and the like. In the above, the wavelength of UV-A is 400-315 nm, the wavelength of UV-B is 315-280 nm, and the wavelength of UV-C is 280-190 nm, because the shorter the wavelength is, the higher the energy is, and the better the activation effect is, the preferred wavelength is 280-190 nm of UV-C light source.

In order to obtain the best activation effect, the ultraviolet light source 5 can be an excimer lamp. Based on the characteristic of the excimer lamp that emits a single and energy-concentrated 172 nm vacuum ultraviolet light (VUV), a vacuum ultraviolet photon energy up to 7.2 eV is emitted, which is sufficient to break most molecular bonds to achieve rapid removal of organic carbides on the surface of the implant 100. Of course, the ultraviolet light source 5 can also be provided as other types of lamps, which are not described one by one here and are all within the scope of protection.

Further, in order to obtain the best activation effect, when the implant support frame 13 is extended into the bottle body 2, the distance from the ultraviolet light source 5 to the implant 100 is 1 mm-10 mm. The intensity of the ultraviolet light is inversely proportional to the square of the distance, if it is too far, the activation effect may be greatly reduced, and if it is too close, it is easy to contact the surface of the implant 100.

In a first embodiment:
pretreatment: the prepared implant 100 was first machined by using a machine, the diameter of the implant 100 was 4 mm and the length was 10 mm, the samples were surface-treated by using the technology of sandblasting and acid etching, and washed and dried in a clean environment. The implant 100 was located in the implant packaging bottle provided by the embodiment of the present disclosure;
activation: 2 h before the experiment, in the implant packaging bottle provided by the embodiment of the present disclosure, the implant 100 was activated and tested immediately after the activation;
test data: contact angle (using a contact angle meter); and
test result: contact angle was 0°.

In the Second Embodiment pretreatment: the prepared implant 100 was first machined by using a machine, the diameter of the implant 100 was 4 mm, and the length was 10 mm, and the samples were surface-treated by using the technology of sandblasting and acid etching, and washed and dried in a clean environment;
activation: no activation was performed;
test data: contact angle (using a contact angle meter); and
test result: contact angle was 89.8°.

It can be known from the above-mentioned embodiments that the contact angle at which the implant packaging bottle provided in the embodiment of the present disclosure activates the implant 100 is reduced.

In the present embodiment, one end of the implant support frame 13 away from the bottle cap body has a connecting part detachably connected to the implant bracket 4; and an avoidance space for avoiding the implant 100 on the implant bracket 4 is provided on the implant support frame 13. Through the above arrangement, the implant 100 is located in the avoidance space of the implant support frame 13, which effectively avoids the contact between the implant 100 and the inner wall of the bottle body 2 or the components in the bottle body 2 during the installation of the bottle cap 1 relative to the bottle body 2, the implant 100 is protected, further reducing the risk of infection.

Figure 7:
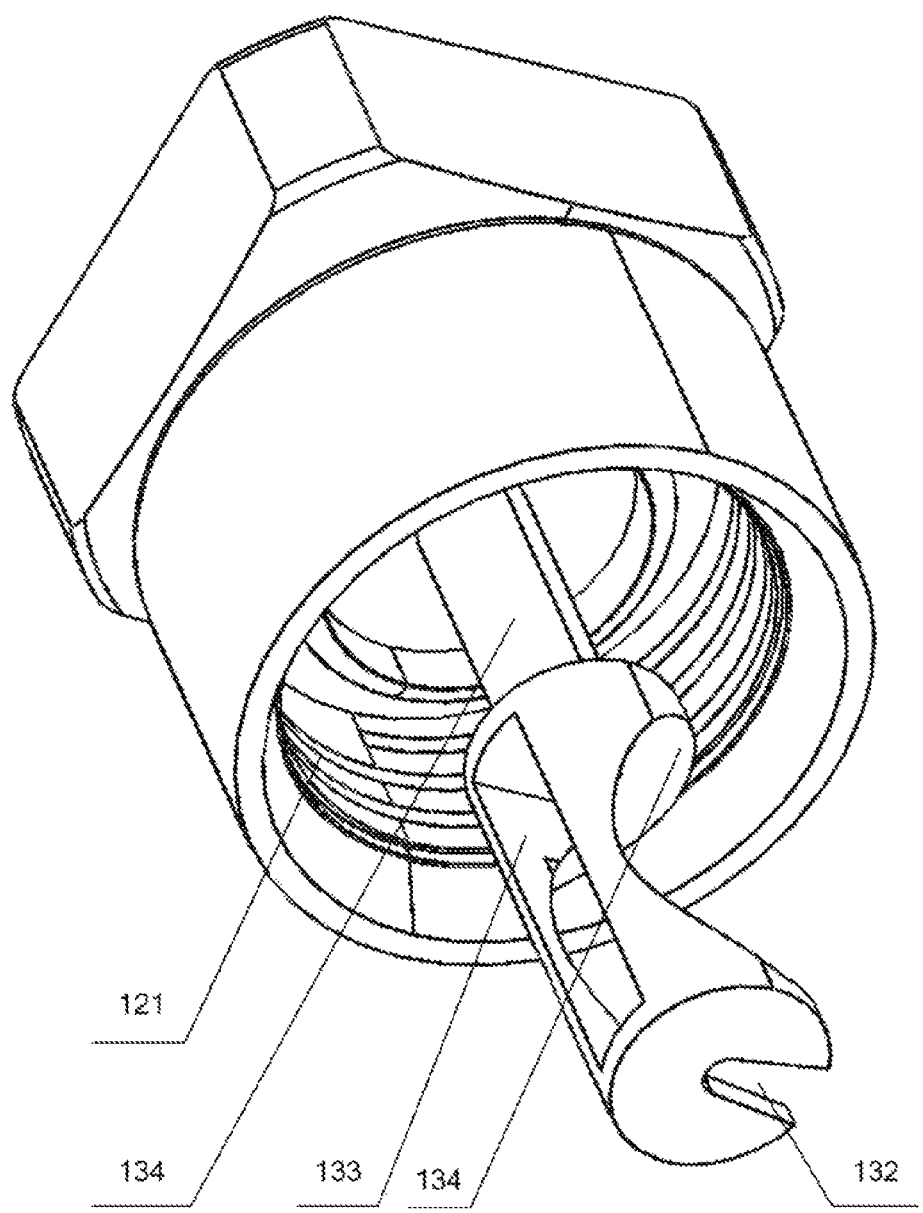
FIG. 7 is a structural schematic view of a bottle cap provided by an embodiment of the present disclosure.
Figure 8:
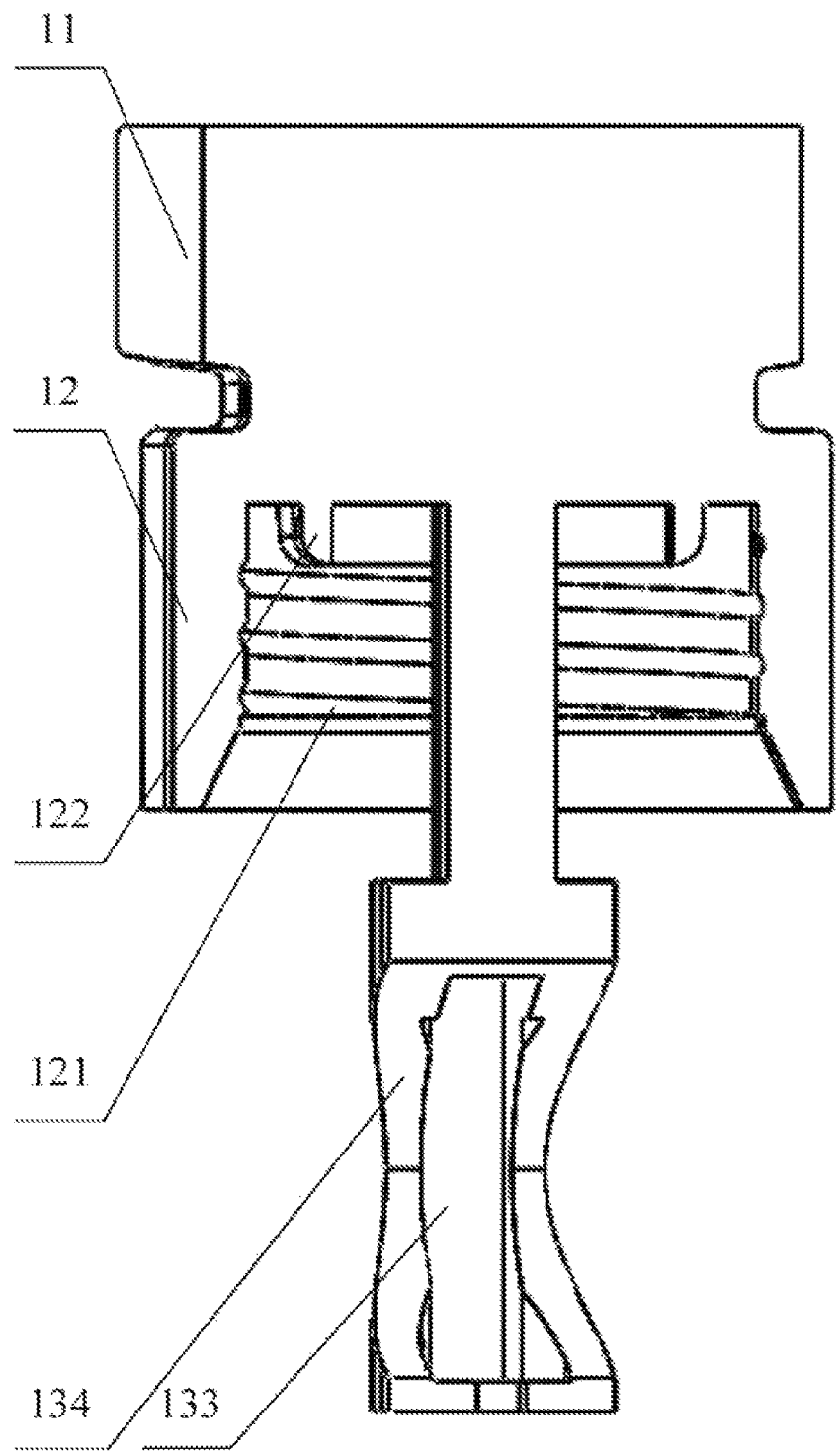
FIG. 8 is a sectional schematic view of a structure of the bottle cap provided by an embodiment of the present disclosure.
Figure 9:
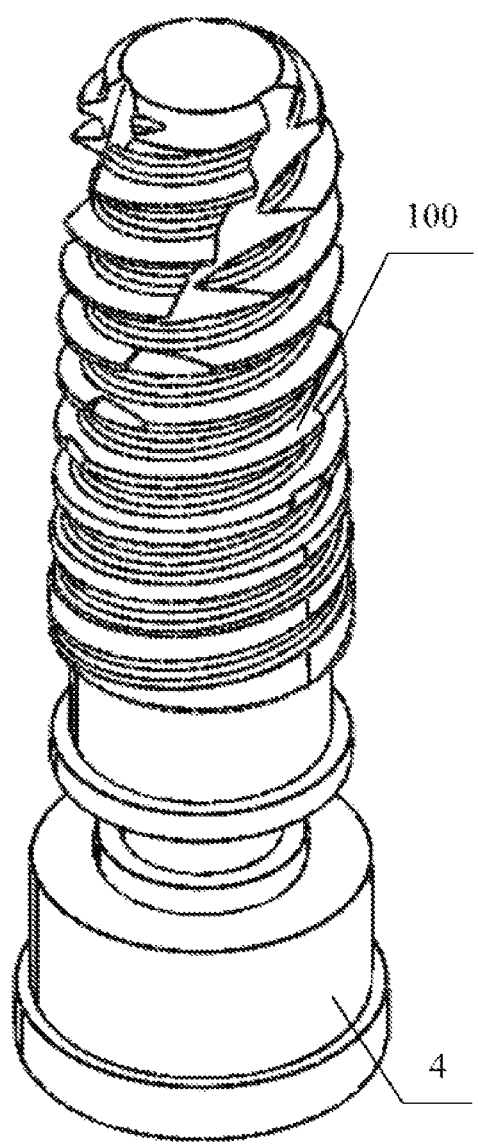
FIG. 9 is a schematic view of an installation structure of the implant bracket and the implant provided by an embodiment of the present disclosure.
Figure 10:
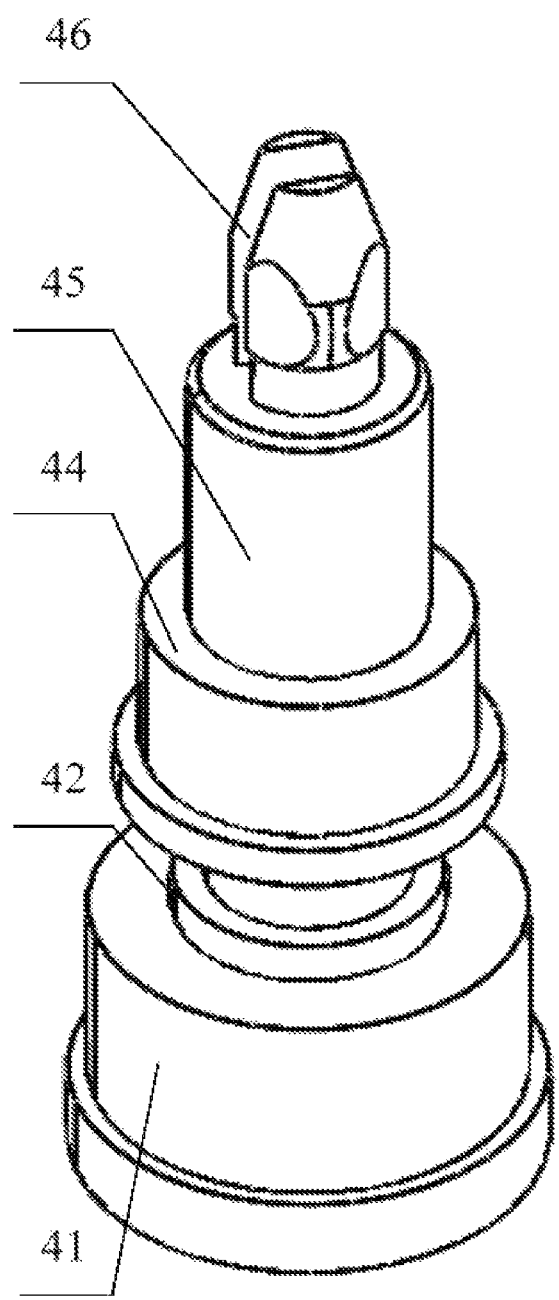
FIG. 10 is a structural schematic view of the implant bracket provided by an embodiment of the present disclosure.
Figure 11:
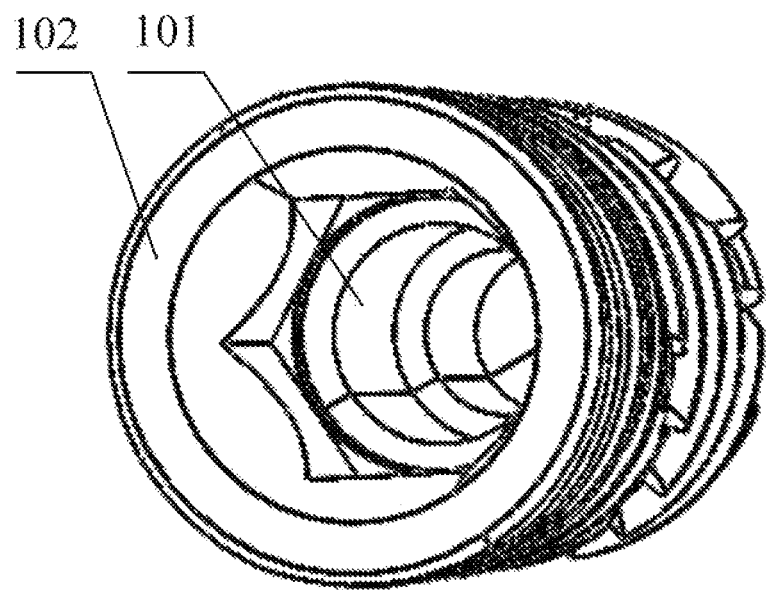
FIG. 11 is a structural schematic view of the implant provided by an embodiment of the present disclosure.
Figure 12:
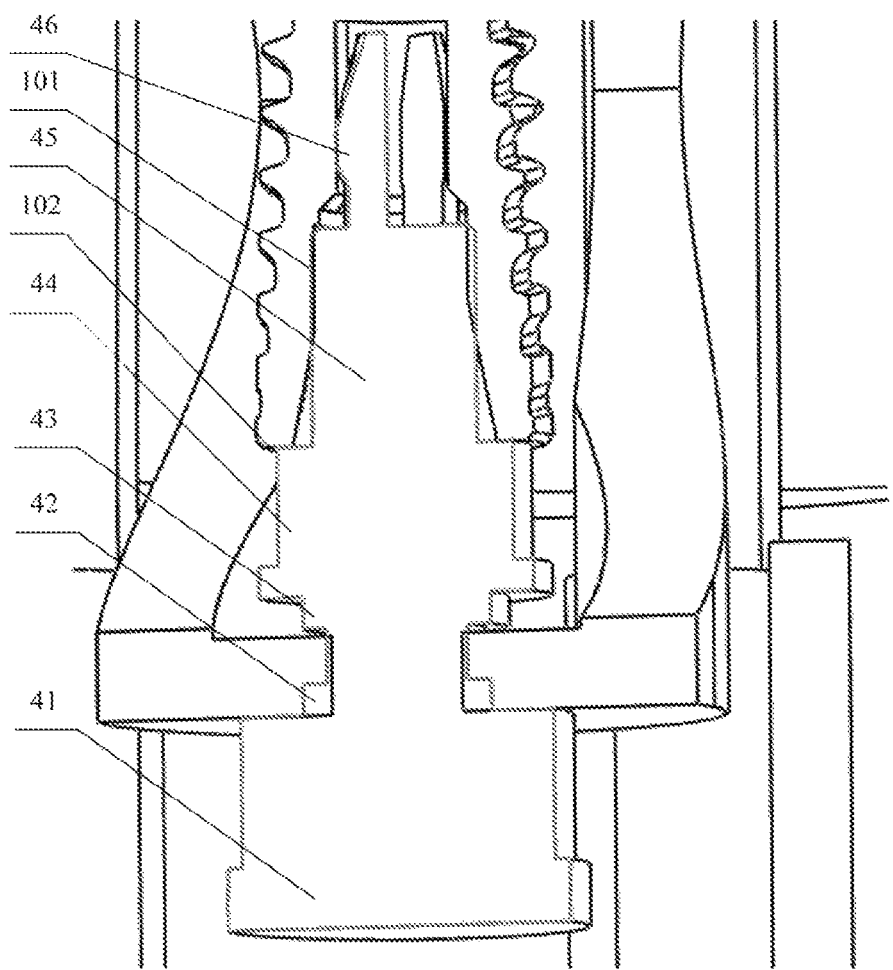
FIG. 12 is a sectional schematic view of the installation of the implant bracket and the implant provided by an embodiment of the present disclosure.

As shown in FIG. 7 and FIG. 8, an avoidance hole 133 and a concave arc surface 134 are provided on the implant support frame 13, the avoidance space is of a concave structure formed by the concave arc surface 134 provided on the implant support frame 13 and sunken to the inside of the implant support frame 13, and the avoidance hole 133 penetrates the concave arc surface 134 and the outer surface of the implant support frame 13 facing away from the concave arc surface 134. Through the above arrangement, on the basis of protecting the implant 100 by the implant support frame 13, the blocking to the ultraviolet light emitted by the ultraviolet light source 5 is reduced as much as possible.

In order to improve the activation effect, the number of ultraviolet light sources 5 is four, which are respectively the first ultraviolet light source, the second ultraviolet light source, the third ultraviolet light source and the fourth ultraviolet light source that are configured to be provided sequentially in the circumferential direction of the implant 100; the second ultraviolet light source and the concave arc orientation of the concave arc surface 134 are provided correspondingly, and the first ultraviolet light source and the third ultraviolet light source are symmetrically provided on two sides of the concave arc surface 134, and the fourth ultraviolet light source is provided correspondingly to the avoidance hole 133. Other numbers of the ultraviolet light source 5, such as three or five, can also be provided.

Figure 6:
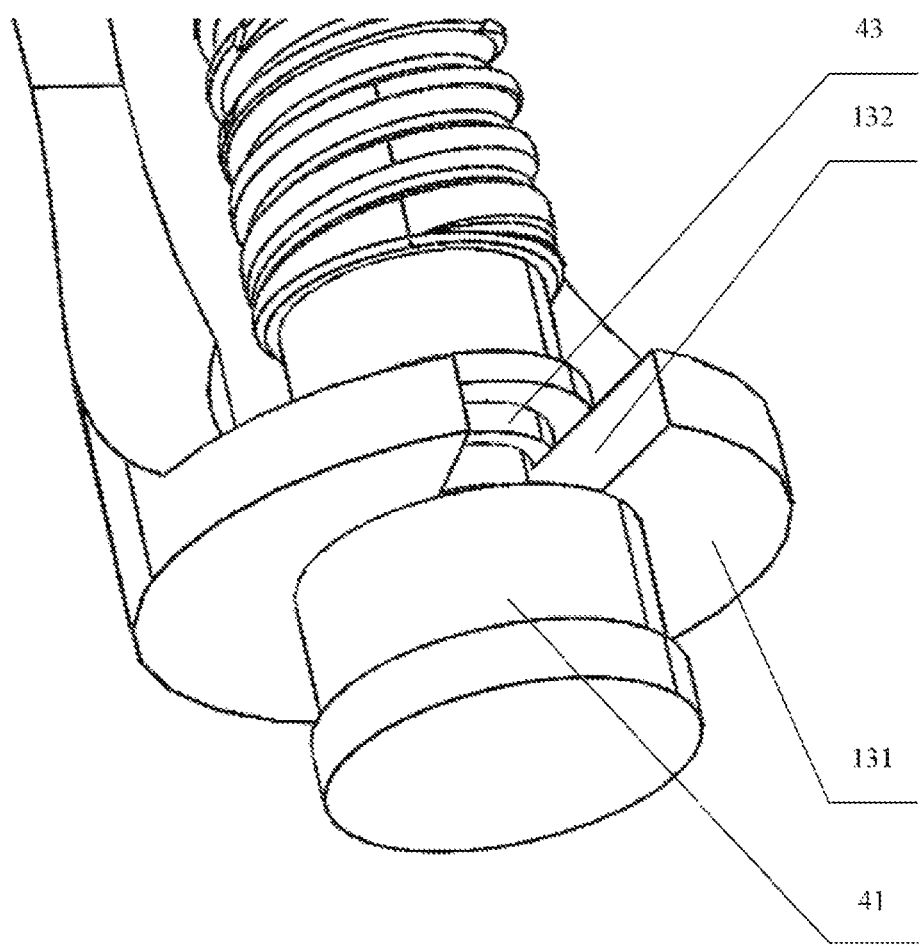
FIG. 6 is a partial schematic view of the installation structure of the implant bracket and the implant support frame provided by an embodiment of the present disclosure.

As shown in FIG. 6, one end of the implant support frame 13 away from the bottle cap body is provided with a snapping plate 131, and a snapping groove 132 is provided on the snapping plate 131, and the implant bracket 4 may be snapped in the snapping groove 132. In this embodiment, the opening of the snapping groove 132 is located at the end of the snapping plate 131 facing away from the avoidance hole 133, so as to facilitate the operation of taking and placing the implant bracket. Through the arrangement of the snapping groove, the operation of detachable connection is realized. It can also be provided as other structures, such as a concave-convex matching structure.

Further, the implant bracket 4 comprises: a first positioning component 43 configured to be contacted in a positioning manner to one side surface of the snapping plate 131; a second positioning component 41 configured to be contacted in a positioning manner to the other side surface of the snapping plate 131; a snapping part connected between the first positioning component 43 and the second positioning component 41; and a fastener 46 configured to be detachably connected with the implant 100, wherein the fastener 46 is provided at the end of the first positioning component 43 away from the second positioning component 41. The above arrangement facilitates the taking and placing of the implant 100 relative to the implant bracket 4, and also facilitates the disassembly and assembly operations of the implant bracket 4 relative to the implant support frame 13.

In order to improve the positioning effect of the implant 100 installed on the implant bracket 4, the implant bracket 4 further includes: a circumferential positioning section 45 configured to be matched in a positioning manner with an inner wall 101 of the implant 100; an axial positioning section 44 configured to be matched in a positioning manner with an end surface 102 of the implant 100, wherein one end of the axial positioning section 44 is connected to the end of the first positioning component 43 away from the second positioning component 41, and the other end of the axial positioning section 44 is connected to the one end of the circumferential positioning section 45, and the other end of the circumferential positioning section 45 is connected to the fastener 46;

In order to improve the installation stability effect of the implant bracket 4 on the implant support frame 13, the implant bracket 4 further includes a positioning snap ring 42, wherein the positioning snap ring 42 is provided on the snapping part; the groove bottom of the snapping groove 132 is provided with a positioning snapping groove matched with the positioning snap ring 42. It can be understood that the snapping part is in an interference fit with the snapping groove 132.

Figure 13:
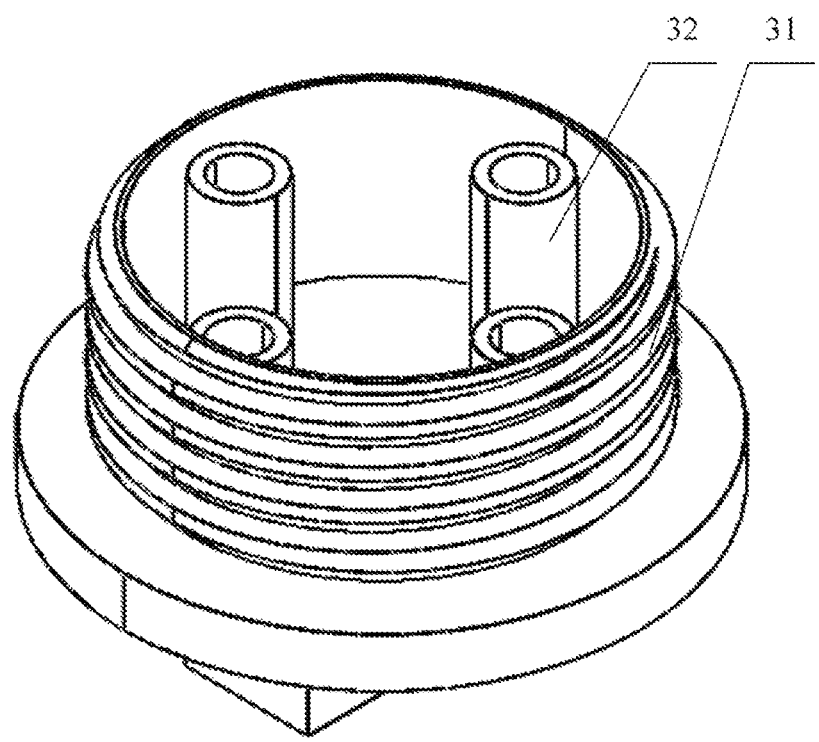
FIG. 13 is a first structural schematic view of an electrified base provided by an embodiment of the present disclosure.
Figure 14:
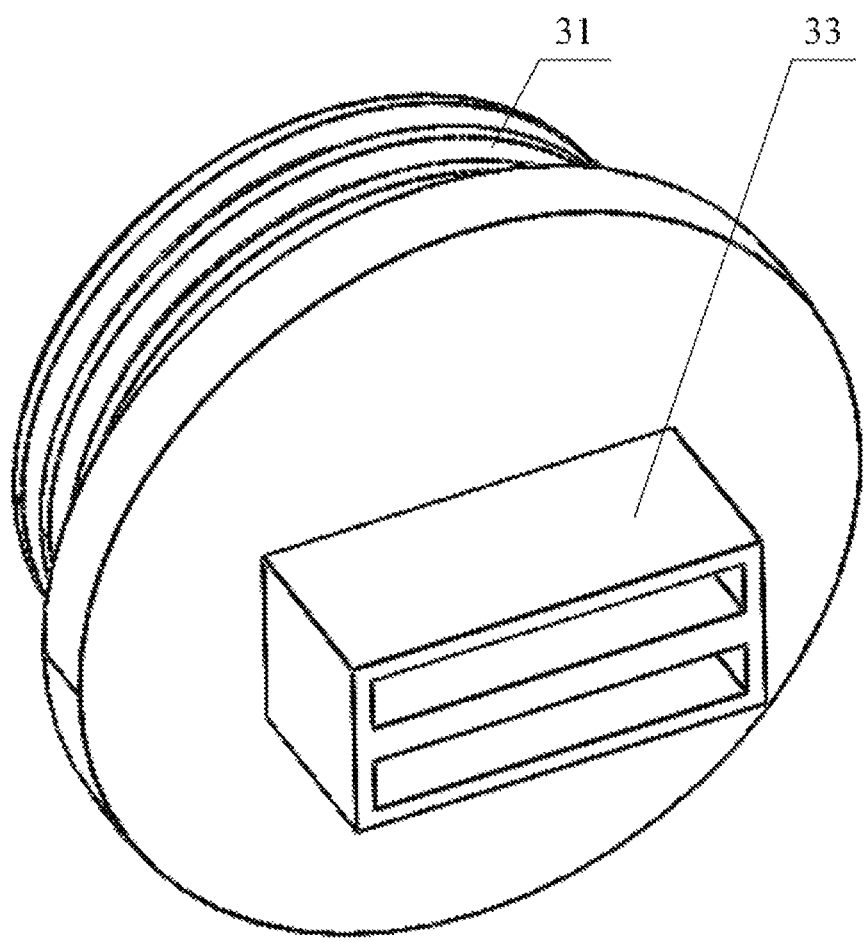
FIG. 14 is a second structural schematic view of the electrified base provided by an embodiment of the present disclosure.
Figure 15:
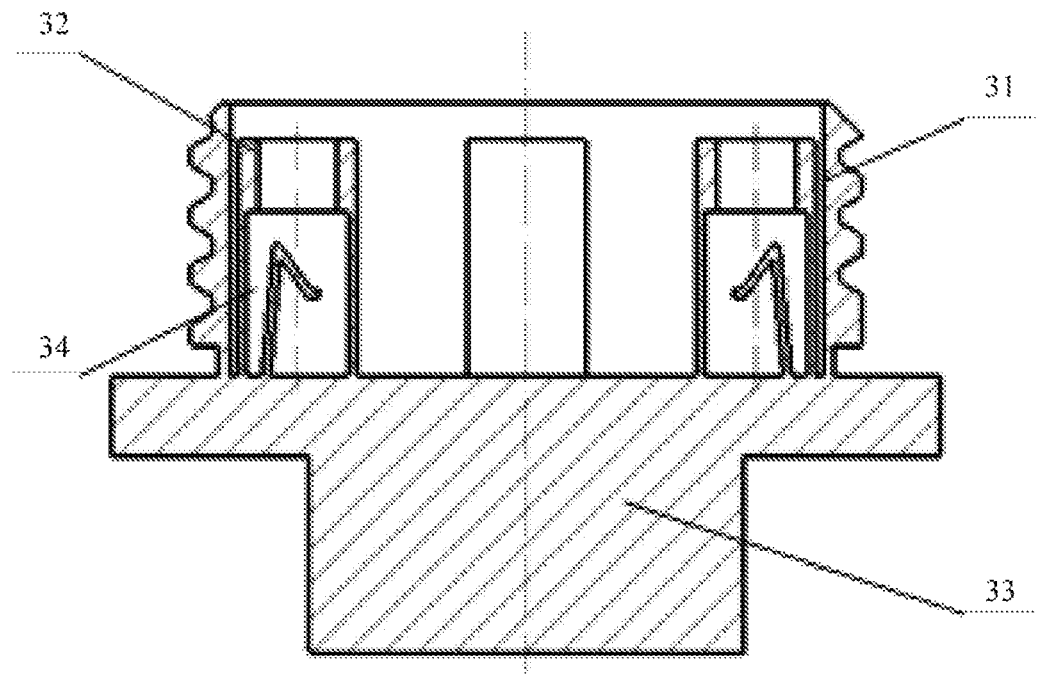
FIG. 15 is a sectional schematic view of a structure of the electrified base provided by an embodiment of the present disclosure.
Figure 16:
FIG. 16 is a structural schematic view of an ultraviolet light source provided by an embodiment of the present disclosure.
Figure 17:
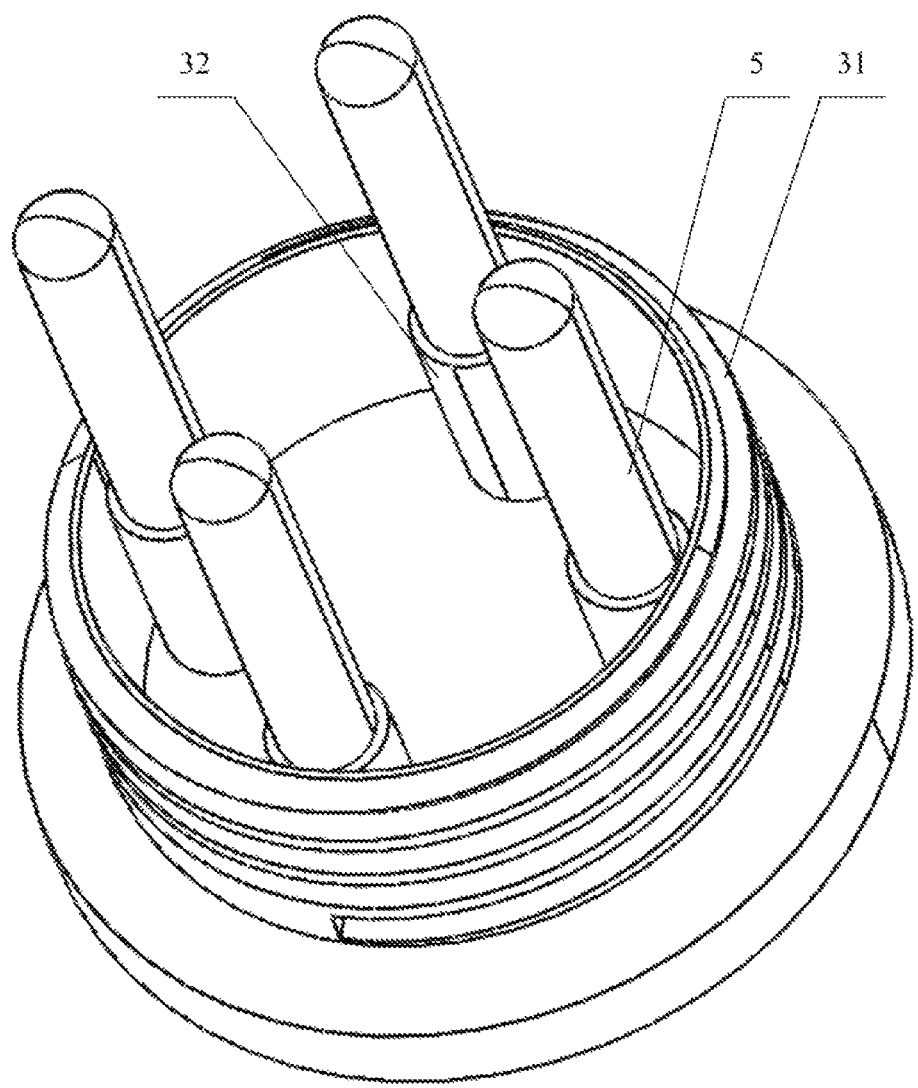
FIG. 17 is a schematic view of an assembly structure of the electrified base and the ultraviolet light source provided by an embodiment of the present disclosure.
Figure 18:
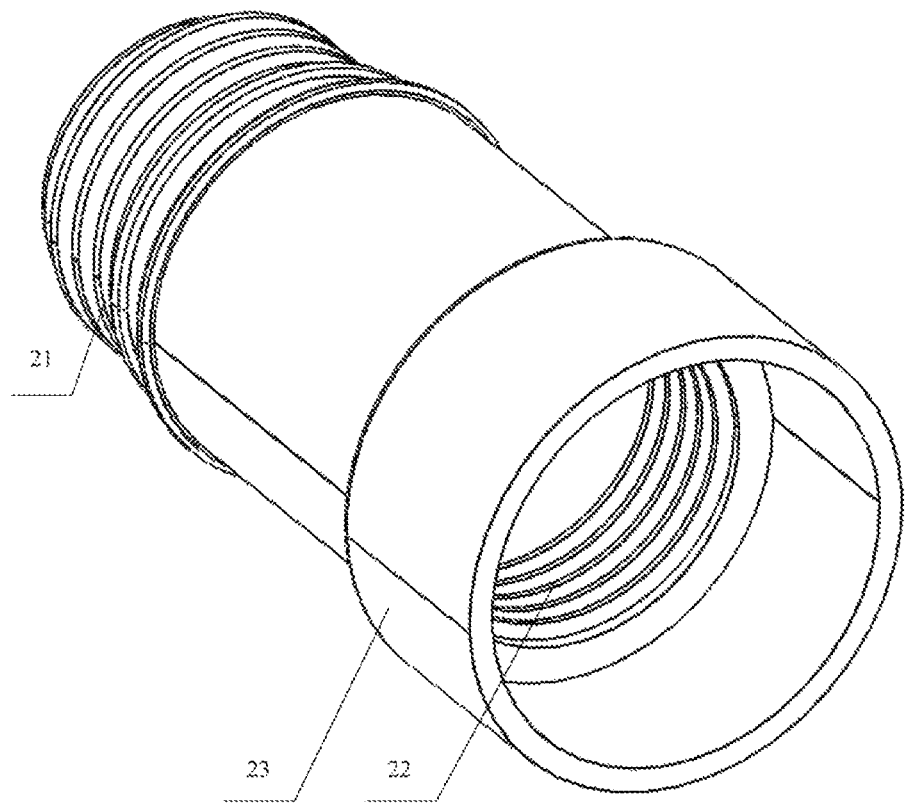
FIG. 18 is a structural schematic view of a bottle body provided by an embodiment of the present disclosure.
Figure 19:
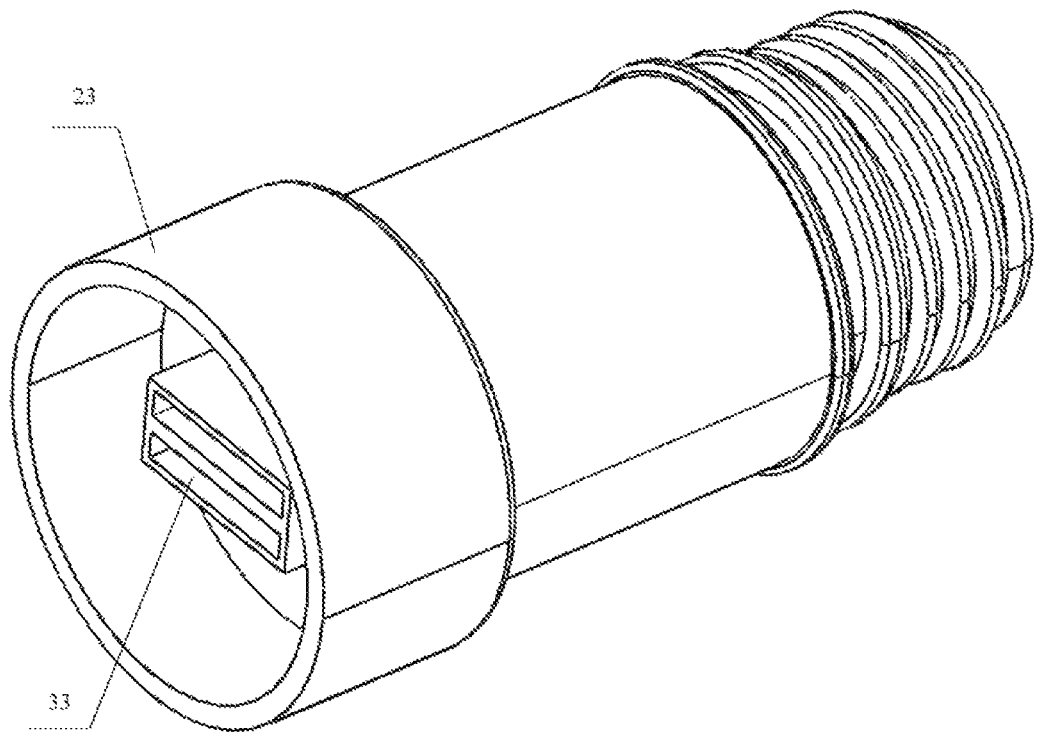
FIG. 19 is a schematic view of an assembly structure of the bottle body and the electrified base provided by an embodiment of the present disclosure.

As shown in FIG. 13, the electrified base 3 comprises a plurality of connecting parts 32; a plurality of the ultraviolet light sources 5 are connected to the plurality of the connecting parts 32 in one-to-one correspondence, through the above arrangement, the ultraviolet light source 5 and the connecting parts 32 are connected to form an independent individual, and the combined structure formed by connecting the plurality of ultraviolet light sources 5 and the connecting parts 32 is provided around the implant 100, so as to provide enough space for the implant 100, thereby optimizing the internal layout of the implant packaging bottle.

Further, the ultraviolet light source 5 comprises a lamp tube body 51 and a conductive connecting part 52; the connecting part 32 is a connecting cylinder provided coaxially with the lamp tube body 51, and a conductive connecting piece 34 conductively connected with the conductive connecting part 52 is provided inside the connecting part 32, that is, the combined structure formed by connecting the ultraviolet light sources 5 and the connecting parts 32 is a columnar structure.

In order to facilitate installation and improve the axial positioning effect, the connection opening of the connecting part 32 is a snapping port; the outer periphery of the conductive connecting part 52 is provided with a limit matching piece 53 that may pass through the snapping port and be positioned axially therewith. In this embodiment, the limit matching piece 53 is an O-shaped ring. The inner diameter of the snapping port is smaller than the inner diameter of the main body part of the connecting part 32, so that the main body part of the connecting part 32 and the interior of the snapping port form a positioning end surface, and the limit matching piece 53 on the outer periphery of the conductive connecting part 52 enters the main body part of the connecting part 32 through the snapping port, the top surface of the limit matching piece 53 facing toward the lamp tube body 51 is positioned and contacted to the positioning end surface, which can prevent the conductive connecting part 52 from being relatively separated from the connecting part 32, so as to achieve the axial positioning effect. Further, the conductive connecting piece 34 is an elastic metal sheet, which provides an upward supporting force to the ultraviolet light source 5.

In one embodiment, the electrified base 3 has a power acquisition component 33, wherein the power acquisition component 33 is a power circuit system and a battery detachably connected to the power circuit system. In the above, the battery may preferably be a button battery.

In another embodiment, the electrified base 3 has a power acquisition component 33, wherein the power acquisition component 33 is a plug-in interface. In the above, the plug-in interface may be a USB interface or other types of interfaces. It is more convenient to obtain power by connecting the plug-in interface to an external power socket.

In order to facilitate the doctor or nurse to apply twisting force, such that the bottle cap 1 and the bottle body 2 are unscrewed, the bottle cap body comprises a top square structure 11 and a bottle cap body 12; and the bottle cap body 12 is detachably connected to one end of the bottle body 2. The top square structure 11 and the bottle cap body 12 may be of an integral structure or a detachable structure.

Further, an accommodating cavity is provided in the top square structure 11, and the top surface or the side surface of the top square structure 11 has a switch door for opening and closing the accommodating cavity. By arranging the accommodating cavity in the top square structure 11, it is convenient to place components (such as sealing screws) used in conjunction with the implant 100, and the switch door may be a screw caps or the like.

In order to protect the electrified base 3, the bottle body 2 includes an outer protecting ring 23 surrounding the outside of the electrified base 3, that is, the electrified base 3 is embedded in the outer protecting ring 23.

In the present embodiment, one end of the bottle body 2 has an external thread section 21, and the inside of the bottle cap 1 has an internal thread structure 121 matched with the external thread section 21.

The electrified base 3 may also be detachably connected to the other end of the bottle body 2, so that the electrified base 3 can be reused when the bottle body 2 cannot be used, so as to improve the utilization rate of the electrified base 3.

Further, the inside of the other end of the bottle body 2 has an internal thread section 22, and the outside of the electrified base 3 has an external thread structure 31 matched with the internal thread section 22.

The various embodiments in this specification are described in a progressive manner, and each embodiment mainly illustrates the differences from other embodiments, and the same and similar parts between the various embodiments can be referred to each other.

The above description of the disclosed embodiments enables any those skilled in the art to achieve or use the present disclosure. Various modifications to these embodiments will be apparent to those skilled in the art, and the generic principles defined herein may be implemented in other embodiments without departing from the spirit or scope of the present disclosure. Thus, the present disclosure is not intended to be limited to the embodiments shown herein, but is to be accorded with the widest scope consistent with the principles and novel features disclosed herein.

What is claimed is:

1. An implant packaging bottle, comprising:
a bottle body;
a bottle cap, wherein the bottle cap has a bottle cap body detachably connected with one end of the bottle body and an implant support frame configured to extend into the bottle body;
an electrified base, wherein the electrified base is provided at the other end of the bottle body;
an implant bracket detachably connected to the implant support frame, wherein the implant bracket is configured to allow an implant to be installed thereon; and
ultraviolet light sources configured to be provided in the bottle body, wherein each of the ultraviolet light sources is electrically connected to the electrified base, and a plurality of the ultraviolet light sources are provided; and the plurality of the ultraviolet light sources are configured to be arranged around the implant on the implant bracket when the implant support frame is extended into the bottle body,
wherein the electrified base comprises a plurality of connecting parts;
the plurality of the ultraviolet light sources are connected to the plurality of connecting parts in one-to-one correspondence;
each of the ultraviolet light sources comprises a lamp tube body and a conductive connecting part; and each of the connecting parts is a connecting cylinder arranged coaxially with the lamp tube body, and a conductive connecting piece conductively connected with the conductive connecting part is provided inside each of the connecting parts.

2. The implant packaging bottle according to claim 1, wherein the ultraviolet light emitted by the ultraviolet light sources is UV-A, UV-B or UV-C; and/or the ultraviolet light sources are excimer lamps.

3. The implant packaging bottle according to claim 1, wherein the implant support frame is configured to extend into the bottle body, such that a distance from each of the ultraviolet light sources to the implant is 1 mm-10 mm.

4. The implant packaging bottle according to claim 1, wherein one end of the implant support frame away from the bottle cap body has a connecting part detachably connected to the implant bracket; and an avoidance hole and a concave arc surface is further provided on the implant support frame, wherein the concave arc surface is provided on the implant support frame to form an avoidance space sunken to an inside of the implant support frame, and the avoidance space is configured to allow the implant on the implant bracket to be provided therein, and the avoidance hole penetrates the concave arc surface and an outer surface of the implant support frame facing away from the concave arc surface.

5. The implant packaging bottle according to claim 4, wherein four ultraviolet light sources are provided, which are respectively a first ultraviolet light source, a second ultraviolet light source, a third ultraviolet light source and a fourth ultraviolet light source that are configured to be arranged sequentially in a circumferential direction of the implant, wherein the second ultraviolet light source and a concave arc orientation of the concave arc surface are provided correspondingly, and the first ultraviolet light source and the third ultraviolet light source are symmetrically provided on two sides of the concave arc surface, and the fourth ultraviolet light source is provided correspondingly to the avoidance hole.

6. The implant packaging bottle according to claim 1, wherein one end of the implant support frame away from the bottle cap body is provided with a snapping plate, and a snapping groove is provided on the snapping plate, and the implant bracket can be snapped in the snapping groove.

7. The implant packaging bottle according to claim 6, wherein the implant bracket comprises:

a first positioning component configured to be contacted in a positioning manner to one side surface of the snapping plate;

a second positioning component configured to be contacted in a positioning manner to the other side surface of the snapping plate;

a snapping part connected between the first positioning component and the second positioning component;

a fastener configured to be detachably connected with the implant, wherein the fastener is provided at one end of the first positioning component away from the second positioning component;

a circumferential positioning section configured to be matched in a positioning manner with an inner wall of the implant;

an axial positioning section configured to be matched in a positioning manner with an end surface of the implant, wherein one end of the axial positioning section is connected to the end of the first positioning component away from the second positioning component, and the other end of the axial positioning section is connected to one end of the circumferential positioning section, and the other end of the circumferential positioning section is connected to the fastener; and a positioning snap ring, wherein the positioning snap ring is provided on the snapping part; and a groove bottom of the snapping groove is provided with a positioning snapping groove matched with the positioning snap ring.

8. The implant packaging bottle according to claim 1, wherein a connection opening of each of the connecting parts is a snapping port;

an outer periphery of the conductive connecting part is provided with a limit matching piece that can pass through the snapping port and be axially positioned relatively to the snapping port.

9. The implant packaging bottle according to claim 1, wherein the electrified base has a power acquisition component, wherein the power acquisition component is a power circuit system and a battery detachably connected to the power circuit system; or, the power acquisition component is a plug-in interface.

10. The implant packaging bottle according to claim 1, wherein the bottle cap body comprises a top square structure and a bottle cap body, wherein the bottle cap body is detachably connected to one end of the bottle body.

11. The implant packaging bottle according to claim 10, wherein an accommodating cavity is provided in the top square structure, and a top surface or a side surface of the top square structure has a switch door for opening and closing the accommodating cavity.

12. The implant packaging bottle according to claim 1, wherein one end of the bottle body has an external thread section, and an inside of the bottle cap has an internal thread structure matched with the external thread section; and/or, an inside of the other end of the bottle body has an internal thread section, and an outside of the electrified base has an external thread structure matched with the internal thread section.

* * * * *